(12) United States Patent
Akagi et al.

(10) Patent No.: US 9,441,586 B2
(45) Date of Patent: Sep. 13, 2016

(54) FUEL SUPPLY DEVICE

(75) Inventors: Masaki Akagi, Okazaki (JP); Chiaki Kataoka, Aichi-gun (JP); Koji Yoshida, Kasugai (JP); Katsunori Kamiya, Kariya (JP)

(73) Assignees: TOYOTA JIDOSHA KABUSHIKI KAISHA, Toyota (JP); AISAN KOGYO KABUSHIKI KAISHA, Obu-shi (JP)

( * ) Notice: Subject to any disclaimer, the term of this patent is extended or adjusted under 35 U.S.C. 154(b) by 203 days.

(21) Appl. No.: 14/123,119

(22) PCT Filed: May 17, 2012

(86) PCT No.: PCT/JP2012/062672
§ 371 (c)(1),
(2), (4) Date: Nov. 29, 2013

(87) PCT Pub. No.: WO2012/165165
PCT Pub. Date: Dec. 6, 2012

(65) Prior Publication Data
US 2014/0096849 A1    Apr. 10, 2014

(30) Foreign Application Priority Data

Jun. 2, 2011  (JP) .................................. 2011-124460

(51) Int. Cl.
*F02M 37/22*  (2006.01)
*F02M 37/00*  (2006.01)
(Continued)

(52) U.S. Cl.
CPC .............. *F02M 37/22* (2013.01); *B01D 29/11* (2013.01); *B01D 35/0273* (2013.01); *F02M 37/0076* (2013.01); *F02M 37/103* (2013.01);
(Continued)

(58) Field of Classification Search
CPC .................. B01D 35/0273; F02M 2037/228; F02M 37/0076; F02M 37/103; F02M 37/22; F02M 2037/225; Y10T 137/7976
See application file for complete search history.

(56) References Cited

U.S. PATENT DOCUMENTS 5,538,633 A      7/1996  Kitajima et al.
5,558,246 A  *   9/1996  Ross, Jr. .................. A47F 7/28
                                                      220/4.22
(Continued)

FOREIGN PATENT DOCUMENTS

JP   U-63-144812    9/1988
JP   A-06-317286   11/1994
(Continued)

OTHER PUBLICATIONS

Office Action issued in Japanese Patent Application No. 2011-124460 mailed on Sep. 9, 2014 (with translation).
(Continued)

*Primary Examiner* — John Kim
(74) *Attorney, Agent, or Firm* — Oliff PLC

(57) ABSTRACT

A fuel supply device is obtained in which joint strength can be maintained in a joint portion of plural filter members configuring a fuel filter. A fuel filter (16) with an overall bag shape is configured by welding together an upper face filter cloth (16U) a lower face filter cloth (16L) of the fuel filter (16) at a welded portion (16C). A sub tank upper side member (15U) and a sub tank lower side member (15L) nip the upper face filter cloth (16U) and the lower face filter cloth (16L) at a nipping position NP that is at a different position from the welded portion (16C).

8 Claims, 7 Drawing Sheets

(51) Int. Cl.
   *F02M 37/10* (2006.01)
   *B01D 29/11* (2006.01)
   *B01D 35/027* (2006.01)

(52) U.S. Cl.
   CPC .. *F02M2037/225* (2013.01); *F02M 2037/228* (2013.01); *Y10T 137/7976* (2015.04)

(56) References Cited

U.S. PATENT DOCUMENTS

| | | | |
|---|---|---|---|
| 5,607,578 A | | 3/1997 | Ohkouchi et al. |
| 5,647,329 A | * | 7/1997 | Bucci ................ B01D 35/0273 123/509 |
| 6,138,686 A | * | 10/2000 | Yuhara ................ A45C 13/008 132/293 |
| 2005/0006300 A1 | | 1/2005 | Sato et al. |
| 2005/0087485 A1 | | 4/2005 | Takahashi |
| 2010/0294464 A1 | | 11/2010 | Graber et al. |
| 2011/0192786 A1 | * | 8/2011 | Nagai .................... F02M 37/22 210/443 |

FOREIGN PATENT DOCUMENTS

| | | |
|---|---|---|
| JP | H07-185224 A | 7/1995 |
| JP | H07-269437 A | 10/1995 |
| JP | H10-184345 A | 7/1998 |
| JP | 2004-124844 A | 4/2004 |
| JP | A-2005-030351 | 2/2005 |
| JP | A-2008-174074 | 7/2008 |
| JP | 2010-194412 A | 9/2010 |

OTHER PUBLICATIONS

Mar. 2, 2016 Office Action issued in U.S. Appl. No. 14/979,036.

* cited by examiner

FUEL SUPPLY DEVICE

TECHNICAL FIELD

The present invention relates to a fuel supply device, and more specifically, relates to a fuel supply device that supplies fuel from inside a fuel tank to an engine, or the like.

BACKGROUND ART

In fuel supply devices that supply fuel inside a fuel tank to an external device such as an engine, fuel supply devices exist that are provided with a fuel filter inside a fuel tank body, and that feed out fuel, from which the fuel filter has removed foreign matter, to the exterior of the fuel tank body. For example, Japanese Patent Application Laid-Open (JP-A) No. H6-317286 describes a fuel filter device with an internal space configured between a first member and a second member, and with a filter member interposed between the first member and the second member.

However, in the structure of the filter described in Patent Document 1, since the filter members are not in close contact with each other, there is a concern that an oil membrane could break, and gas could flow into the space between the filter members, when for example an upper side filter member is no longer in contact with the fuel. Simply joining together the plural filter members may be considered in order to suppress this eventuality, however since external forces sometimes act on the joint portion through the first member and/or the second member, it is desirable to maintain the strength of the joint.

SUMMARY OF INVENTION

Technical Problem

In consideration of the above circumstances, an object of the present invention is to obtain a fuel supply device capable of maintaining the joint strength of a joint portion between plural filter members configuring a fuel filter.

Solution to Problem

A fuel supply device of a first aspect of the present invention includes: a fuel tank body that stores fuel; a fuel filter that is provided inside the fuel tank body and formed in an overall bag shape with plural sheets of filter members superimposed on each other and joined together by a joint portion so as to permit passage of the fuel and restrict the passage of foreign matter in the fuel; a nipping member that nips the plurality of sheets of filter members at a nipping position that is a different position from the joint portion; a separation maintaining member that is disposed between the plurality of sheets of filter members and that maintains a separation between the filter members; and a feed-out device that feeds out fuel from inside the fuel filter to the fuel tank body exterior.

In this fuel supply device, the bag shaped fuel filter is configured by superimposing and joining together the plural sheets of filter members with the joint portion. Since the plural sheets of filter members are in close contact with each other at the joint portion, even when any one of the filter members stops being in contact with the fuel, an oil membrane can be maintained on a filter member as long as another of the filter members is in contact with the fuel, suppressing gas from flowing inside the fuel filter.

The separation maintaining member disposed between the filter members maintains the separation between the filter members (a gap between the filter members). Foreign matter in the fuel is removed as the fuel passes through the filter members and flows inside the fuel filter. The fuel inside the fuel filter is then fed out externally by the feed-out device.

The plural sheets of filter members are nipped at the nipping position by the nipping member. The shape of the filter members (filter member) can be maintained and the strength of the filter members can be secured, and moreover the filter members can be attached to the fuel tank body, due to employing the nipping member.

The nipping position of the nipping member is at a different position from the joint portion. Accordingly, external forces do not act on the joint portion even when external forces act on the filter members through the nipping member. The joint strength of the joint portion can accordingly be maintained.

A fuel supply device of a second aspect of the present invention is the fuel supply device of the first aspect, wherein: the fuel filter is formed in a flattened bag shape by employing the plural sheets of filter members disposed from top to bottom, and joining the plural sheets of filter members together with the joint portion set at an outer peripheral portion of the filter members; and the nipping member nips the plural sheets of filter members in an up-down direction at the nipping position.

Due to employing the plural sheets of filter members disposed from top to bottom with the joint portion set at the outer peripheral portion of the filter members, the bag shaped fuel filter can be configured with a simple structure. Since the filter member has a flattened bag shape, the filter member can be disposed for example along the bottom face of the fuel tank body.

The nipping member nips the plural sheets of filter members in the up-down direction at the nipping position. Namely, the plural sheets of filter members can be reliably nipped along the superimposing direction.

A fuel supply device of a third aspect of the present invention is the fuel supply device of the second aspect, wherein: the separation maintaining member is disposed so as to maintain the separation between the plural sheets of filter members in the up-down direction The separation maintaining member enables the separation between the plural sheets of filter members to be reliably positioned in the up-down direction.

A fuel supply device of a fourth aspect of the present invention is the fuel supply device the fuel supply device of any one of the first aspect to the third aspect, wherein: the joint portion and the nipping position are adjacent to each other as viewed along the superimposing direction of the plural sheets of filter members.

Due to the joint portion and the nipping position being adjacent to each other in this way, even when fuel attempts to move to the outside of the fuel filter through the filter members at portions configuring the joint portion, such movement can be suppressed at the nipping position.

A fuel supply device of a fifth aspect of the present invention is the fuel supply device of any one of the first aspect to the fourth aspect, wherein: the nipping position is positioned to an inner side of the joint portion.

Note that "inner side" here refers to the inner side as viewed along the superimposing direction of the filter members (the far side relative to the outer peripheral portion of the filter members).

Namely, the nipping position is further to the inner side than the joint portion. Accordingly, even when force acts on the plural sheets of filter members in a direction to move the plural sheets of filter members apart from each other further to the inner side than the nipping position, this force does not act on the joint portion. The joint strength of the joint portion can accordingly be maintained.

A fuel supply device of a sixth aspect of the present invention is the fuel supply device of any one of the first aspect to the fourth aspect, wherein: the joint portion is positioned to an inner side of the nipping position.

Namely, the nipping position is further to the outer side than the joint portion. Accordingly, even when an external force acts further to the outer side than the nipping position, this external force does not act on the joint portion. The joint strength of the joint portion can accordingly be maintained.

A fuel supply device of a seventh aspect of the present invention is the fuel supply device of any one of the first aspect to the sixth aspect, wherein: the nipping member includes: two nipping tabs that are rotatably coupled to each other by a hinge portion; and a nipping maintaining member that maintains a nipping state of the plurality of sheets of filter members by the two nipping tabs.

The 2 nipping tabs can accordingly be rotated to nip the plural filter members, and the nipped state can be maintained by the nipping maintaining member.

Since the 2 nipping tabs are coupled together by the hinge portion, the number of components is reduced compared to a configuration in which the 2 nipping tabs are configured by separate bodies, and integral molding of the nipping tabs also becomes possible. Moreover, due to integrating together a portion of the nipping tabs, an assembly operation of the 2 nipping tabs, and a nipping operation of the filter members, can be made simpler.

Advantageous Effects of Invention

Due to the configuration described above, the present invention enables the joint strength of the joint portion of the plural filter members configuring the fuel filter to be maintained.

DESCRIPTION OF EMBODIMENTS

Figure 1:
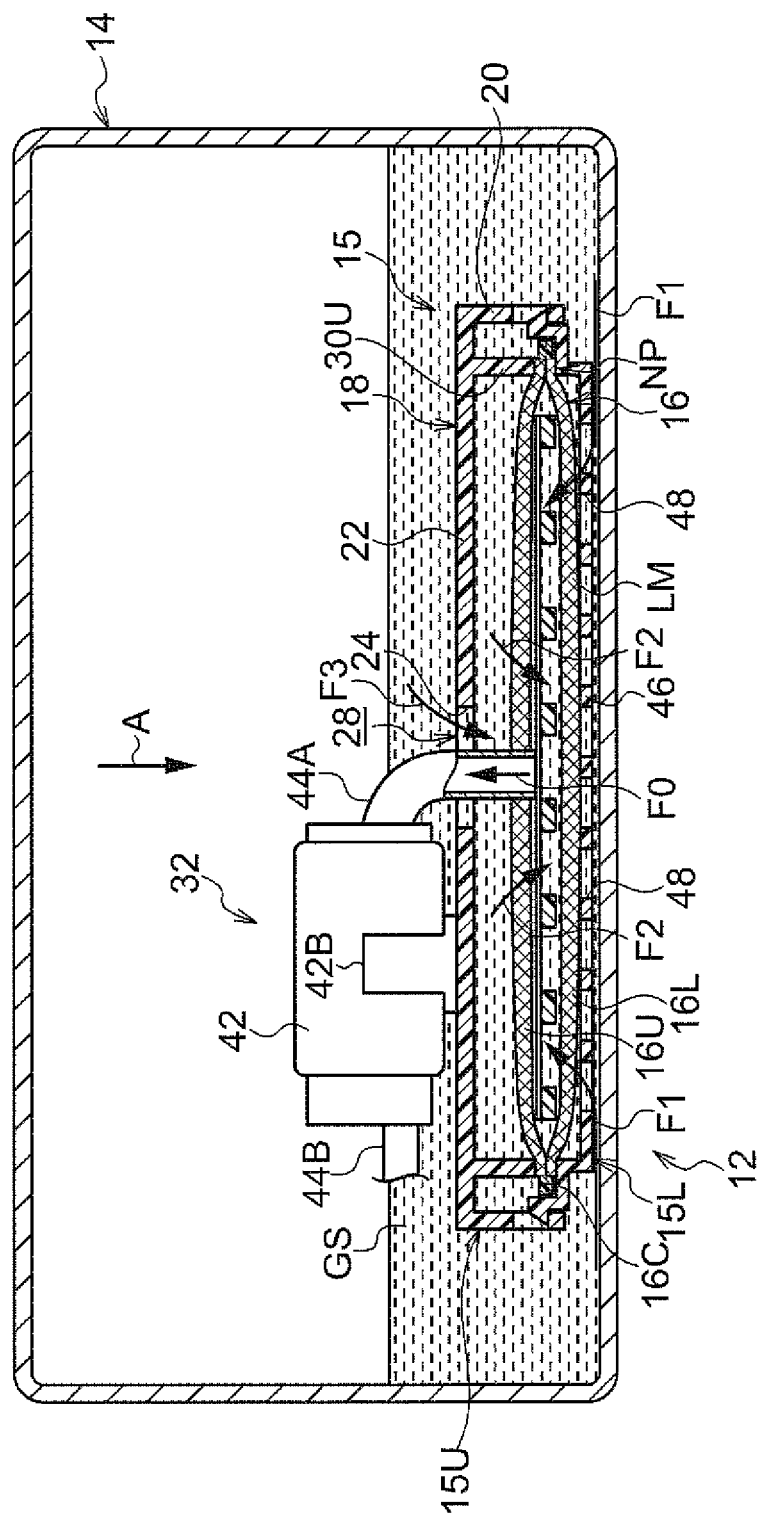
FIG. 1 is a cross-section illustrating a fuel supply device of a first exemplary embodiment of the present invention in a state in which there is plentiful fuel inside a fuel tank body.
Figure 2:
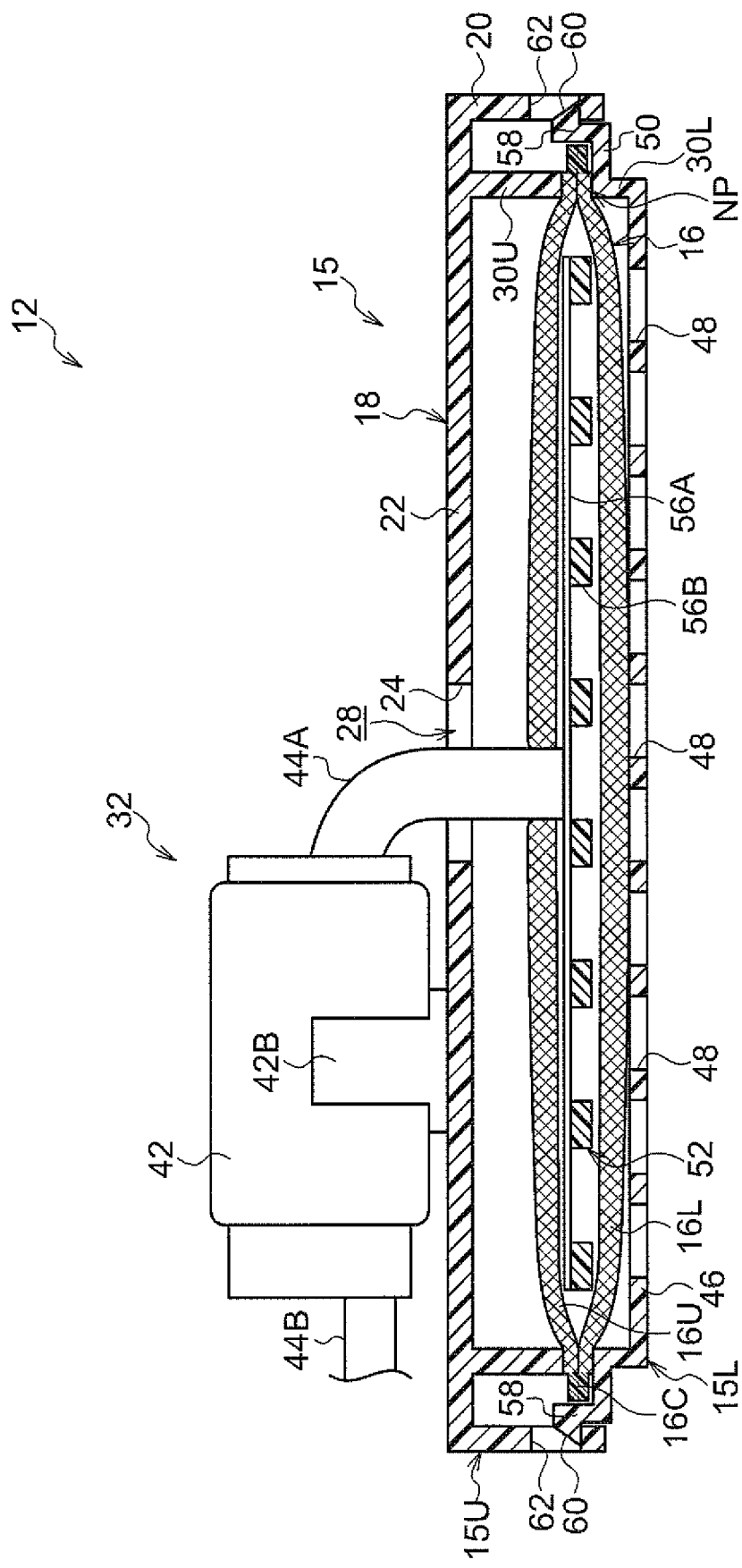
FIG. 2 is a cross-section illustrating a sub tank configuring a fuel supply device of the first exemplary embodiment of the present invention.

FIG. 1 illustrates a schematic configuration of a fuel supply device 12 of a first exemplary embodiment of the present invention. The fuel supply device 12 includes a fuel tank body 14 in which fuel is stored. The fuel tank body 14 is for example configured in a substantially box shape, and a sub tank 15 that includes a fuel filter 16 and a storage member 18 as illustrated in FIG. 2 is disposed inside the fuel tank body 14.

The fuel filter 16 includes plural sheets of filter cloths (in the present exemplary embodiment, two filter cloths of an upper face filter cloth 16U and a lower face filter cloth 16L) disposed from top to bottom. In the present exemplary embodiment, a welded portion 16C serving as an example of a joint portion of the present invention is set at outer peripheral portions of the upper face filter cloth 16U and the lower face filter cloth 16L respectively. The upper face filter cloth 16U and the lower face filter cloth 16L are partially superimposed on each other and welded together at the welded portion 16C. A spacing member 52 is disposed between the upper face filter cloth 16U and the lower face filter cloth 16L. The fuel filter 16 is accordingly configured with a flattened bag shape (with a closed curved face shape) overall, with a space in which fuel is housed configured between the upper face filter cloth 16U and the lower face filter cloth 16L.

The upper face filter cloth 16U and the lower face filter cloth 16L allow fuel to pass from the outside to the inside of the bag shaped fuel filter 16. Foreign matter is removed from the fuel by restricting the passage of foreign matter in the fuel as the fuel passes from the outside to the inside of the bag shaped fuel filter 16. The inside of the fuel filter 16A is configured from a material that acts to prevent the inflow of foreign matter (such as from a woven fabric, a nonwoven fabric, a porous resin or a mesh shaped member). The upper face filter cloth 16U and the lower face filter cloth 16L are formed in the same shape as each other (this may be for example a polygonal shape such as a quadrilateral shape, a circular shape, or an elliptical shape) in plan view (as viewed along the arrow A direction). The fuel filter 16 is capable of storing in an inside portion fuel that has passed through the upper face filter cloth 16U and the lower face filter cloth 16L. In a state in which at least a portion of the fuel filter 16 is immersed in the fuel inside the fuel tank body 14, an oil membrane LM of the fuel is formed and maintained on the surface of the fuel filter 16.

The fuel filter 16 (in particular, the lower face filter cloth 16L) is disposed substantially parallel to a bottom face 14B of the fuel tank body 14, with a gap configured between the fuel filter 16 and the bottom face 14B. Fuel is able to flow inside the fuel filter 16 through this gap, as illustrated by the arrow F1 in FIG. 1.

Figure 3:
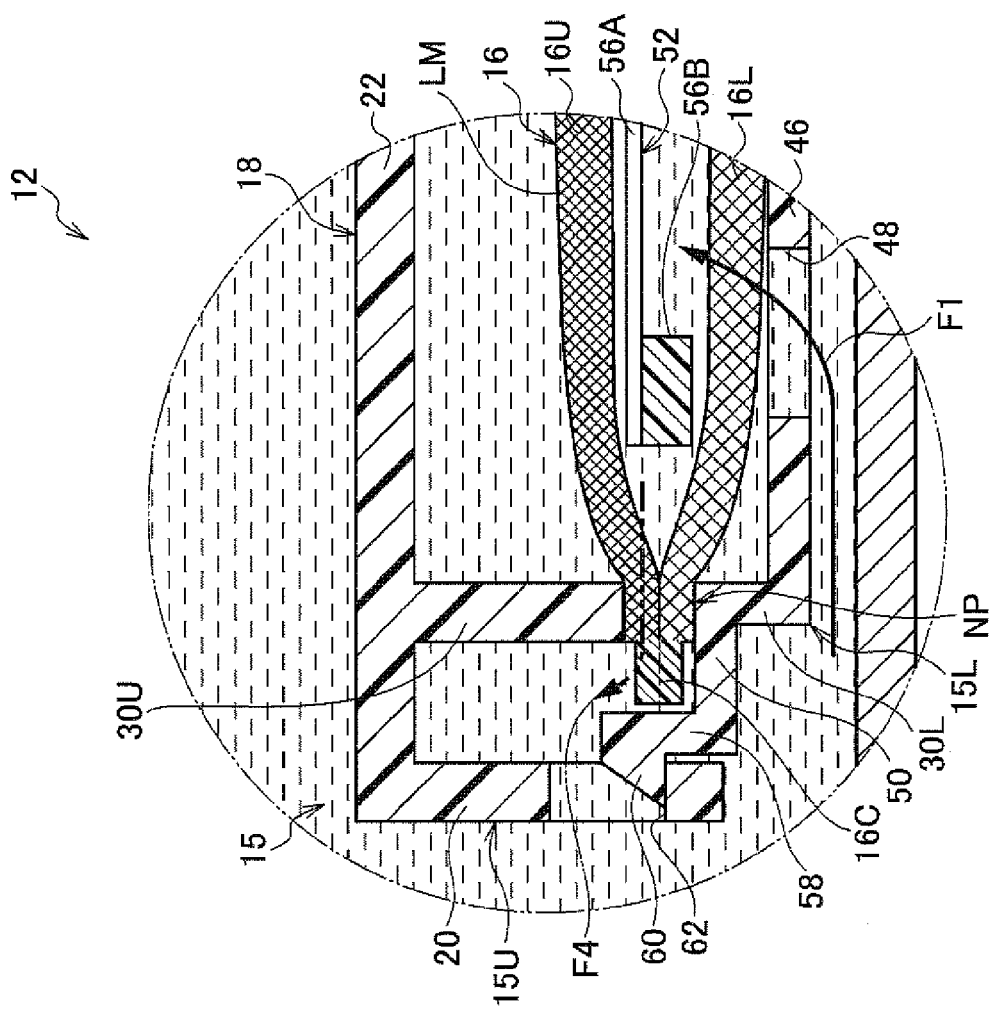
FIG. 3 is an enlarged cross-section illustrating a portion of a fuel supply device of the first exemplary embodiment of the present invention.

As illustrated in FIG. 3, the upper face filter cloth 16U and the lower face filter cloth 16L are configured by different materials. In particular, the materials for the filter cloths are selected such that the pressure loss of the upper face filter cloth 16U is greater than the pressure loss of the lower face filter cloth 16L. "Pressure loss" refers to the difference in pressure between pressure prior to passage and pressure after passage when the fuel passes through the upper face filter cloth 16U or the lower face filter cloth 16L (for example when a fuel pump body 42, described later, is being driven). Fuel can accordingly be made to pass relatively readily through the lower face filter cloth 16L compared to the upper face filter cloth 16U. In the present exemplary embodiment, a structure is adopted wherein the upper face filter cloth 16U has a smaller total surface area of gaps in a nonwoven fabric than the lower face filter cloth 16L in order to provide this difference in pressure loss.

The spacing member 52 between the upper face filter cloth 16U and the lower face filter cloth 16L includes plural sideways framework strips 56A disposed parallel to each other in the horizontal direction, and plural lengthways framework strips 56B disposed parallel to each other in the horizontal direction so as to intersect orthogonally with the sideways framework strips 56A. The framework strips are disposed between the upper face filter cloth 16U and the lower face filter cloth 16L, such that the upper face filter cloth 16U and the lower face filter cloth 16L do not contact each other in the up-down direction at the portions where the framework strips are present, thereby configuring the space for storing the fuel.

The sub tank 15 includes a sub tank upper side member 15U positioned to the upper side of the fuel filter 16, and a sub tank lower side member 15L positioned to the lower side of the fuel filter 16. Both the sub tank upper side member 15U and the sub tank lower side member 15L serve as examples of "nipping tabs" of the present invention.

The sub tank upper side member 15U includes a vertical wall portion 20 that is positioned to the periphery of the fuel filter 16 in plan view (as viewed along the arrow A direction). The vertical wall portion 20 is for example formed in a flattened cylinder shape. A lid plate portion 22 extends from an upper edge of the vertical wall portion 20 in a direction approaching a fuel suction tube 44A, described later (a direction approaching the center as seen in plan view).

As seen in plan view, an upper side nipping wall 30U projects downwards from the lid plate portion 22 to the inside of the vertical wall portion 20. The upper side nipping wall 30U is positioned adjacent to the welded portion 16C to an inner side of the welded portion 16C as seen in plan view. As will be described later, the upper face filter cloth 16U and the lower face filter cloth 16L are nipped in the up-down direction between the upper side nipping wall 30U and a lower side nipping wall 30L.

In the present exemplary embodiment, the storage member 18 is configured by the upper side nipping wall 30U, the lid plate portion 22 to the inside of the upper side nipping wall 30U, and the upper face filter cloth 16U of the fuel filter 16. In other words, at least a portion (the entirety in the example illustrated in FIG. 2) of a bottom portion of the storage member 18 is configured by the upper face filter cloth 16U. The storage member 18 is capable of storing fuel above the fuel filter 16.

An inflow hole 24 is formed penetrating the lid plate portion 22 in the thickness direction at a substantially central portion of the lid plate portion 22. The fuel suction tube 44A is inserted through the center of the inflow hole 24. The inner diameter of the inflow hole 24 is configured larger than the outer diameter of the fuel suction tube 44A. The hole edge of the inflow hole 24 does not make contact with the fuel suction tube 44A, and as illustrated by the arrow F3, fuel is able to flow inside the storage member 18 through a gap 28 formed therebetween. Since the inflow hole 24 doubles as an insertion through hole for insertion of the fuel suction tube 44A, there is no need to form an additional insertion through hole for this purpose, achieving a simplification in structure.

The sub tank lower side member 15L includes a bottom plate portion 46 below the lower face filter cloth 16L. Plural insertion through holes 48 are formed penetrating the bottom plate portion 46 in the thickness direction. As shown by the arrow F1, fuel GS inside the fuel tank body 14 is able to flow inside the fuel filter 16 through the insertion through holes 48.

The flattened circular cylinder shape lower side nipping wall 30L projects up from the periphery of the bottom plate portion 46. The lower side nipping wall 30L configures a nipping member of the present invention. The upper face filter cloth 16U and the lower face filter cloth 16L are nipped between the lower side nipping wall 30L and the upper side nipping wall 30U in the superimposing direction of the upper face filter cloth 16U and the lower face filter cloth 16L (in the up-down direction).

As illustrated in FIG. 3, a nipping position of the upper face filter cloth 16U and the lower face filter cloth 16L between the upper side nipping wall 30U and the lower side nipping wall 30L (a nipping position NP) is at a different position from the welded portion 16C, and is moreover set at a position adjacent to the welded portion 16C as seen in plan view (as viewed along the superimposing direction). In particular, in the present exemplary embodiment the nipping position NP is positioned to an inner side of the welded portion 16C in plan view.

Due to nipping the fuel filter 16 with the sub tank upper side member 15U and the sub tank lower side member 15L in this manner, the shape of the fuel filter 16 is maintained and the strength of the fuel filter 16 is secured. The fuel filter 16 can moreover be stably disposed at a specific position (a position along the bottom face 14B) inside the fuel tank body 14.

An outer ring portion 50 is formed from the lower side nipping wall 30L towards the outside in plan view. The outer ring portion 50 is configured in a ring shape, and is configured with a shape that enters to the inside of the vertical wall portion 20 of the sub tank upper side member 15U. Plural engagement cylinders 58 project upwards from specific positions on the outer ring portion 50. Engagement tabs 60 project out from the engagement cylinders 58. The engagement tabs 60 engage with engagement holes 62 formed in the vertical wall portion 20 (for example by what is referred to as snap-fitting), thereby attaching the sub tank lower side member 15L to the sub tank upper side member 15U at specific attachment positions.

Moreover, in the present exemplary embodiment, outer peripheral portions of the fuel filter 16 (portions to the outside of the fuel filter 16) make contact with inner peripheral faces of the engagement cylinders 58. The fuel filter 16 is accordingly positioned with respect to the sub tank 15.

As illustrated in FIG. 1 and FIG. 2, a fuel pump module 32 is provided above the storage member 18. The fuel pump module 32 includes the fuel pump body 42. In the present exemplary embodiment, the fuel pump body 42 is supported over the sub tank 15 by a bracket 42B.

The fuel suction tube 44A extends downwards from one side face of the fuel pump body 42. A lower end of the fuel suction tube 44A penetrates the upper face filter cloth 16U to open inside the fuel filter 16. A fuel ejection tube 44B extends upwards from the other side face of the fuel pump body 42 to the outside of the fuel tank body 14. By driving the fuel pump body 42, fuel can be sucked through the fuel suction tube 44A and supplied to an engine, not illustrated in the drawings, through the fuel ejection tube 44B.

Explanation follows regarding operation of the fuel supply device 12 of the present exemplary embodiment.

As illustrated in FIG. 1, in a state in which the fuel GS is present inside the fuel tank body 14 with the fuel surface higher than the inflow hole 24 of the storage member 18, fuel that has flowed in through the gap 28 (between the inflow hole 24 and the fuel suction tube 44A) is stored inside the storage member 18. In this state, fuel is also present inside the fuel filter 16.

When the fuel pump module 32 is driven, as shown by the arrow F0, the fuel inside the fuel filter 16 is fed out to the outside (to an engine or the like) through the fuel suction tube 44A and the fuel ejection tube 44B. Fuel is able to flow into the fuel filter 16 through the upper face filter cloth 16U (see the arrow F2) and the lower face filter cloth 16L (see the arrow F1). Moreover, as shown by the arrow F3, fuel inside the fuel tank body 14 flows inside the storage member 18 through the gap 28.

Figure 4:
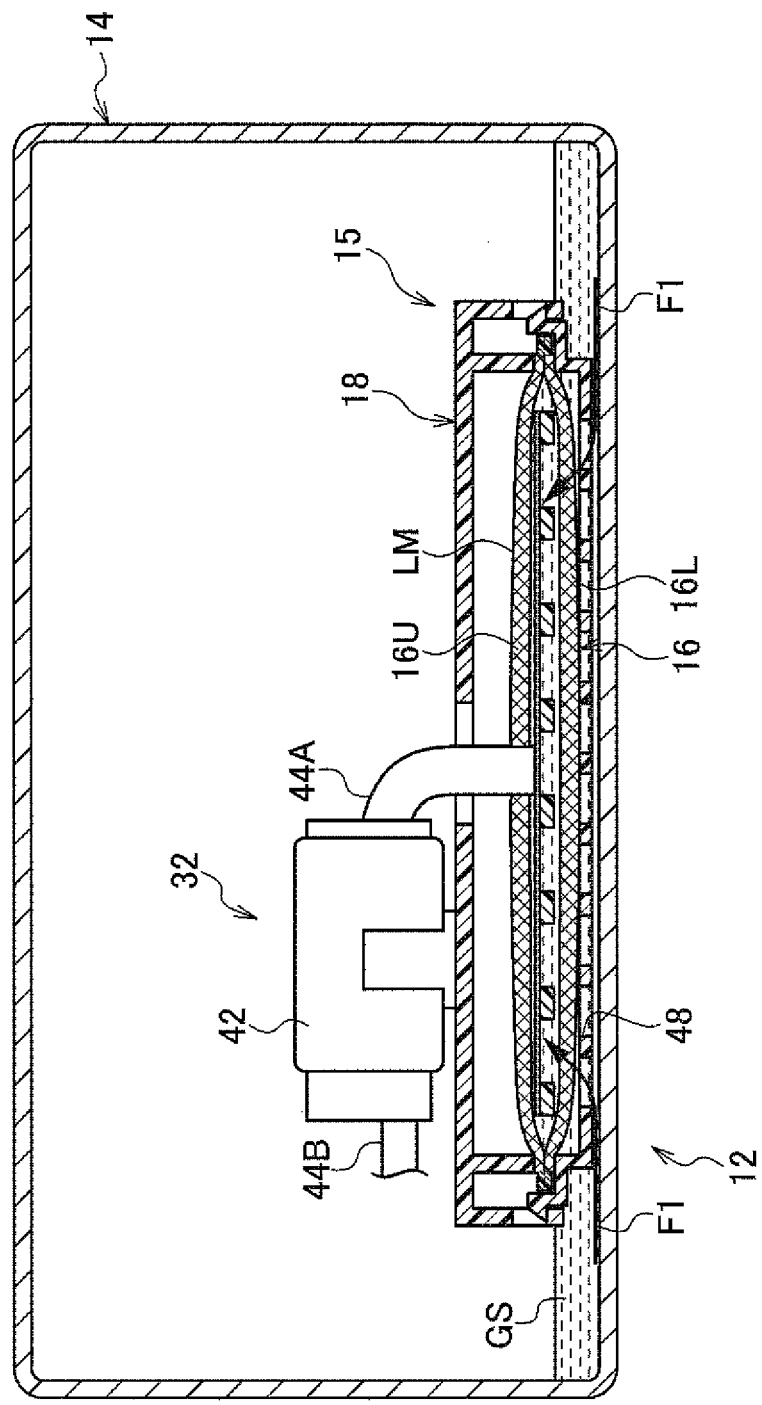
FIG. 4 is a cross-section illustrating a fuel supply device of the first exemplary embodiment of the present invention in a state in which fuel inside a fuel tank body has been depleted.

As illustrated in FIG. 4, in a state in which the amount of fuel inside the fuel tank body 14 has been depleted, an oil membrane LM of the fuel is formed and maintained on the surface of the fuel filter 16 as long as at least a portion of the fuel filter 16 is immersed in the fuel. In the present exemplary embodiment, the fuel filter 16 is disposed along the bottom face 14B of the fuel tank body 14, thereby enabling a contact state between the fuel and the fuel filter 16 (lower face filter cloth 16L) inside the fuel tank body 14 to be more reliably maintained.

Moreover, in the present exemplary embodiment, the upper face filter cloth 16U and the lower face filter cloth 16L are welded together at the welded portion 16C, placing the upper face filter cloth 16U and the lower face filter cloth 16L in close contact with each other. Accordingly, even when for example the fuel GS is not in contact with the upper face filter cloth 16U, as long as the fuel GS is in contact with the lower face filter cloth 16L, the oil membrane LM of the fuel is formed and maintained on the surface of the fuel filter 16.

Figure 5:
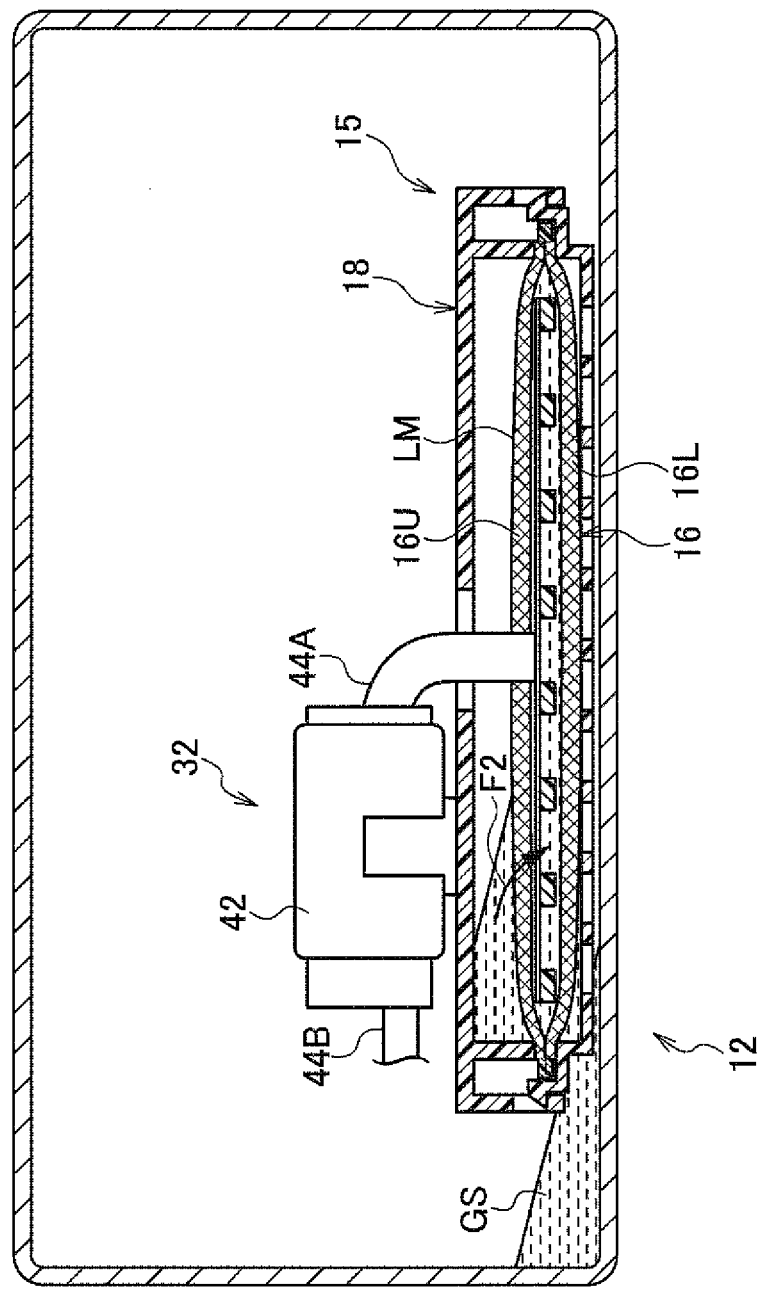
FIG. 5 is a cross-section illustrating a fuel supply device of the first exemplary embodiment of the present invention, in which fuel inside a fuel tank body and a sub tank is in a tilted state.

The liquid surface of the fuel GS inside the fuel tank body 14 sometimes tilts, for example during acceleration and turning of the vehicle. During such tilting of the liquid surface, portions of the fuel filter 16 to the upper side of the fuel surface are exposed to air inside the fuel tank body 14, however the oil membrane LM on the fuel filter 16 surface is maintained as long as a portion to the lower side of the liquid surface is immersed in the fuel. Moreover, as illustrated in FIG. 5, even when the surface of the fuel inside the fuel tank body 14 has reached the lower side of the fuel filter 16, the oil membrane LM of the fuel is formed and maintained on the surface of the fuel filter 16 as long as a portion of the fuel filter 16 (the upper face filter cloth 16U) is in contact with the fuel stored in the storage member 18.

Since the energy required for feeding out the fuel has the relationship (gas suction from gas phase)>(fuel suction from liquid phase) due to the surface tension of the oil membrane, only fuel is sucked inside the fuel filter 16. Accordingly in such a state, driving the fuel pump module 32 enables the fuel inside the fuel filter 16 to be fed out to the outside.

In the present exemplary embodiment, the sub tank 15 is configured including the sub tank upper side member 15U and the sub tank lower side member 15L, and the upper face filter cloth 16U and the lower face filter cloth 16L are nipped by the upper side nipping wall 30U and the lower side nipping wall 30L. The shape of the fuel filter 16 can accordingly be stably maintained, and it is possible to stably dispose the fuel filter 16 at a specific position inside the fuel tank body 14.

As can be seen from FIG. 2 and FIG. 3, the nipping position NP of the upper face filter cloth 16U and the lower face filter cloth 16L by the upper side nipping wall 30U and the lower side nipping wall 30L is configured at a different position from the welded portion 16C. Load from the sub tank 15 and other external forces act on the nipping position NP due to external disturbances caused by for example vehicle vibration. However, external forces do not act on the welded portion 16C. The weld strength of the welded portion 16C can accordingly be maintained. The fuel filter 16 can accordingly be configured at lower cost since there is no need for a high weld strength in consideration of external forces acting on the welded portion 16C.

In particular, in the present exemplary embodiment, as seen in plan view the nipping position NP is disposed further to the inner side than the welded portion 16C. Even when forces FA, FB act in directions to move the upper face filter cloth 16U and the lower face filter cloth 16L apart from each other, due to the presence of the nipping position NP these forces FA, FB do not act on the welded portion 16C. Namely, the weld strength of the welded portion 16C can be maintained even with respect to forces moving the upper face filter cloth 16U and the lower face filter cloth 16L apart from each other.

Moreover, in the present exemplary embodiment, the nipping position NP and the welded portion 16C are adjacent to each other in plan view. As shown by the arrow F4 in FIG. 3, even when the fuel GS inside the fuel filter 16 attempts to penetrate between the upper face filter cloth 16U and the lower face filter cloth 16L, the space between the upper face filter cloth 16U and the lower face filter cloth 16L is small at the nipping position NP, reducing the permeability of the fuel. Penetration of the fuel GS is accordingly suppressed at the nipping position NP. The space between the upper face filter cloth 16U and the lower face filter cloth 16L is also small at the welded portion 16C. Accordingly, even were a tiny amount of the fuel GS to penetrate between the upper face filter cloth 16U and the lower face filter cloth 16L, penetration of the fuel GS is again suppressed at the welded portion 16C. Unintentional leakage due to the fuel GS penetrating between the upper face filter cloth 16U and the lower face filter cloth 16L can accordingly be effectively suppressed.

Figure 6:
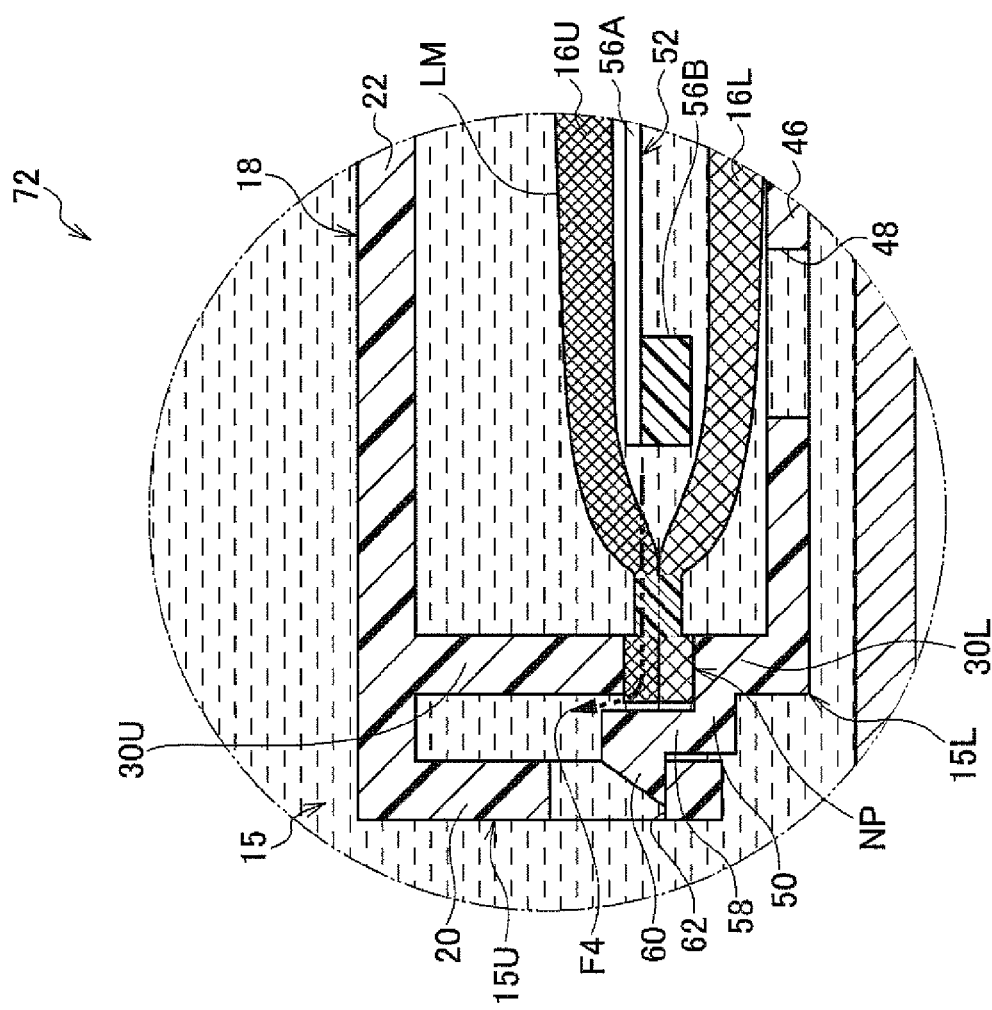
FIG. 6 is an enlarged cross-section illustrating a portion of a fuel supply device of a modified example of the first exemplary embodiment of the present invention.

Note that put simply, in order to effectively suppress penetration of the fuel GS between the upper face filter cloth 16U and the lower face filter cloth 16L, it is sufficient for the nipping position NP and the welded portion 16C to be adjacent to each other in plan view. FIG. 6 is an enlarged illustration of the vicinity of the welded portion 16C and the nipping position NP in a fuel supply device 72 of a modified example of the first exemplary embodiment. In the fuel supply device 72 of the modified example, the nipping position NP where the upper side nipping wall 30U and the lower side nipping wall 30L nip the upper face filter cloth 16U and the lower face filter cloth 16L is configured at an outer peripheral portion of the upper face filter cloth 16U and the lower face filter cloth 16L in plan view. The welded portion 16C is set at the inside of the nipping position NP. Since in this structure the nipping position NP and the welded portion 16C are again adjacent to each other in plan view, penetration of the fuel GS from the inside of the fuel filter 16 can be suppressed at the welded portion 16C, and also suppressed at the nipping position NP.

Moreover, in the fuel supply device 72 of the modified example, the nipping position NP is positioned at the outer peripheral portion of the upper face filter cloth 16U and the lower face filter cloth 16L. Accordingly, even when the vertical wall portion 20 of the sub tank upper side member 15U and the welded portion 16C move relatively towards each other due to for example external disturbances, the force acting on the welded portion 16C from the vertical wall portion 20 is lessened by the vertical wall portion 20. The weld strength of the welded portion 16C can accordingly be maintained.

Figure 7:
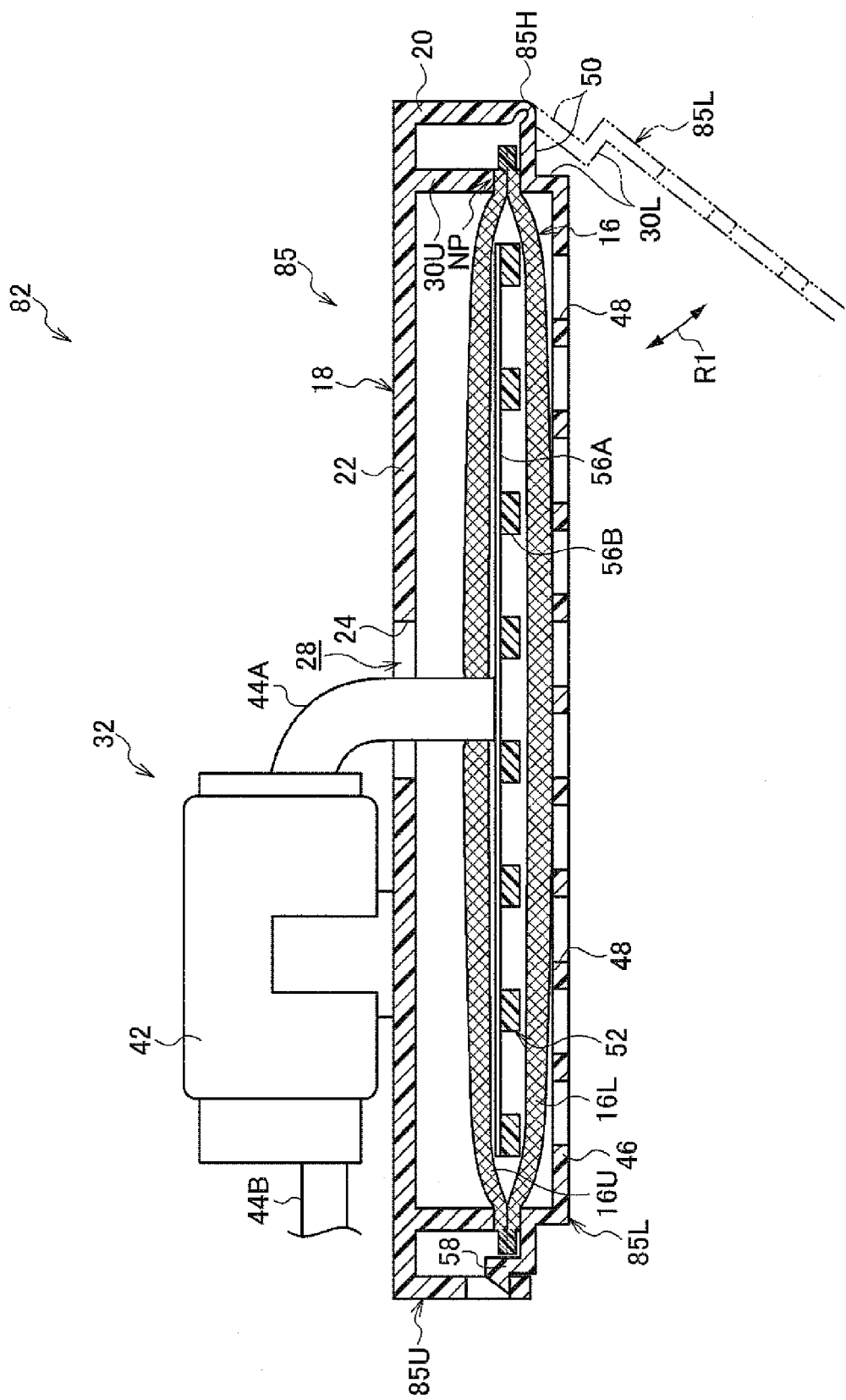
FIG. 7 is a cross-section illustrating a sub tank configuring a fuel supply device of a second exemplary embodiment of the present invention.

FIG. 7 illustrates a sub tank 85 configuring a fuel supply device 82 of a second exemplary embodiment of the present invention. Note that the overall configuration of the fuel supply device 82 of the second exemplary embodiment is similar to that of the fuel supply device 12 of the first exemplary embodiment and is therefore omitted from illustration in the drawings. Configuration elements, members and the like of the sub tank 85 of the second exemplary embodiment that are similar to those of the sub tank 15 of the first exemplary embodiment are allocated the same reference numerals, and detailed explanation thereof is omitted.

In the sub tank 85 of the second exemplary embodiment, a sub tank upper side member 85U and a sub tank lower side member 85L are of substantially the same shape as the sub tank upper side member 85U and the sub tank lower side member 85L of the first exemplary embodiment. However, the sub tank upper side member 85U and the sub tank lower side member 85L are coupled together by a hinge portion 85H provided to portions of the outer peripheries thereof. Due to the hinge portion 85H, the sub tank lower side member 85L rotates with respect to the sub tank upper side member 85U as shown by the arrow R1. On the opposite side to the hinge portion 85H, an engagement tab 60 of the sub tank lower side member 85L engages with an engagement hole 62 of the sub tank upper side member 85U (for example by what is referred to as snap fitting).

In particular, in the present exemplary embodiment, the hinge portion 85H is configured by a thinned hinge. The sub tank upper side member 85U and the sub tank lower side member 85L are integrated together by the hinge portion 85H.

The fuel supply device 82 of the second exemplary embodiment configured in this manner obtains similar operation and advantageous effects to those of the fuel supply device 12 of the first exemplary embodiment.

Moreover, in the fuel supply device 82 of the second exemplary embodiment, the sub tank upper side member 85U and the sub tank lower side member 85L are integrated together, resulting in fewer components than in a configuration employing separate bodies. The number of assembly processes can be reduced due to integrally molding the sub tank upper side member 85U and the sub tank lower side member 85L together.

Moreover, since portions of the sub tank upper side member 85U and the sub tank lower side member 85L are integrated together in advance, the nipping process of the upper face filter cloth 16U and the lower face filter cloth 16L can be made easier.

Note that in the present invention, the pressure loss of the upper face filter cloth 16U and the pressure loss of the lower face filter cloth 16L may be the same as each other, however in each of the above exemplary embodiments the pressure loss of the lower face filter cloth 16L is set lower (smaller) than the pressure loss of the upper face filter cloth 16U. Since more of the fuel flows inside the fuel filter 16 by passing through the lower face filter cloth 16L, a stored state of the fuel inside the storage member 18 can be maintained.

There is no limitation of the joint portion of the present invention to the welded portion 16C described above. Briefly put, it is sufficient for plural sheets of filter members (the upper face filter cloth 16U and the lower face filter cloth 16L) to be contiguously joined together. For example, the joint portion of the present invention includes examples configured with plural sheets of filter members that are made contiguous to each other by for example adhering or sewing to configure a fuel filter with an overall bag shape. Moreover, in the present invention, by positioning the nipping position NP at a different position from the joint portion, the joint strength of adhered portions or sewn portions can be maintained when configuration is made with adhered or sewn joint portions.

An example has been given above wherein the fuel filter of the present invention is configured by the two members of the upper face filter cloth 16U and the lower face filter cloth 16L. However configuration may also be made employing 3 or more filter cloths (filter members). When 3 or more filter members are employed, a fuel filter can be formed with an overall bag shape by joining together the filter members at the joint portion. The filter members configuring the fuel filter should be nipped with the nipping position set at a different position from the joint portion.

There is no limitation of the nipping members of the present invention to the upper side nipping wall 30U or the lower side nipping wall 30L provided to the sub tank upper side member 15U, 85U (nipping tabs) and the sub tank lower side member 15L, 85L (nipping tabs). For example, configuration may be made with members that act to maintain the shape and secure the strength of the fuel filter 16 (plural sheets of filter members) simply by nipping the fuel filter 16 from above and below at the nipping position NP, without configuring the sub tank 15.

In the above explanation, both the upper side nipping wall 30U and the lower side nipping wall 30L are formed in circular cylinder shapes, with the nipping position NP configured in a ring shape. However the nipping position of the present invention does not have to be set in a ring shape with respect to the filter members (the upper face filter cloth 16U and the lower face filter cloth 16L), and may for example be set in the shape of a ring with a missing portion, or may be set with a non-continuous shape following the outer periphery of the fuel filter 16 (the upper face filter cloth 16U and the lower face filter cloth 16L).

Moreover, the relationship between the storage member 18 and the fuel suction tube 44A is not limited to the relationship described above. For example, configuration may be made with a structure wherein the fuel suction tube 44A penetrates the lid plate portion 22 at a different position from the inflow hole 24 of the lid plate portion 22.

The storage member 18 may be configured such that a portion of the fuel filter 16 is not covered (wherein a portion of the fuel filter 16 sticks out to the outside of the storage member 18 as viewed from above). In such cases, by connecting the fuel suction tube 44A to the sticking out portion of the fuel filter 16 (outer portion of the storage member 18), a structure is possible in which the fuel suction tube 44A does not penetrate the lid plate portion 22.

In the above explanation, the fuel pump module 32 including the fuel pump body 42 is given as an example of a feed-out device of the present invention. However, for example in a configuration in which negative pressure is employed to feed the fuel to the outside of the fuel tank body 14, the fuel pump body 42 is not required.

The invention claimed is:

1. A fuel supply device comprising:
   a fuel tank body that stores fuel;
   a fuel filter that is provided inside the fuel tank body and formed in an overall bag shape with a plurality of sheets of filter members superimposed on each other and joined together by a joint portion so as to permit passage of the fuel and restrict passage of foreign matter in the fuel;
   a nipping member that nips the plurality of sheets of filter members at a nipping position that is a different position from the joint portion without overlapping the weld portion;

a separation maintaining member that is disposed between the plurality of sheets of filter members and that maintains a separation between the filter members; and a feed-out device that feeds out fuel from inside the fuel filter to the fuel tank body exterior;

wherein the weld portion and the nipping position are adjacent to each other as viewed along the superimposing direction of the plurality of sheets of filter members.

2. The fuel supply device of claim 1, wherein:

the fuel filter is formed in a flattened bag shape by employing the plurality of sheets of filter members disposed from top to bottom, and joining the plurality of sheets of filter members together with the joint portion set at an outer peripheral portion of the filter members; and the nipping member nips the plurality of sheets of filter members in an up-down direction at the nipping position.

3. The fuel supply device of claim 2, wherein the separation maintaining member is disposed so as to maintain the separation between the plurality of sheets of filter members in the up-down direction.

4. The fuel supply device of claim 1, wherein the nipping member comprises:

two nipping tabs that are rotatably coupled to each other by a hinge portion; and a nipping maintaining member that maintains a nipping state of the plurality of sheets of filter members by the two nipping tabs.

5. A fuel supply device comprising:

a fuel tank body that stores fuel;

a fuel filter that is provided inside the fuel tank body and formed in an overall bag shape with a plurality of sheets of filter members superimposed on each other and joined together by a weld portion so as to permit passage of the fuel and restrict passage of foreign matter in the fuel;

a nipping member that nips the plurality of sheets of filter members at a nipping position that is a different position than the weld portion without overlapping the weld portion, wherein the weld portion and the nipping position are positioned on a same side of the bag shape;

a separation maintaining member that is disposed between the plurality of sheets of filter members and that maintains a separation between the filter members; and a feed-out device that feeds out fuel from inside the fuel filter to the fuel tank body exterior;

wherein the nipping position is positioned to an inner side of the bag shape from the weld portion.

6. The fuel supply device of claim 5 wherein the weld portion and the nipping position are adjacent to each other as viewed along the superimposing direction of the plurality of sheets of filter members.

7. A fuel supply device comprising:

a fuel tank body that stores fuel;

a fuel filter that is provided inside the fuel tank body and formed in an overall bag shape with a plurality of sheets of filter members superimposed on each other and joined together by a weld portion so as to permit passage of the fuel and restrict passage of foreign matter in the fuel;

a nipping member that nips the plurality of sheets of filter members at a nipping position that is a different position than the weld portion without overlapping the weld portion, wherein the weld portion and the nipping position are positioned on a same side of the bag shape;

a separation maintaining member that is disposed between the plurality of sheets of filter members and that maintains a separation between the filter members; and a feed-out device that feeds out fuel from inside the fuel filter to the fuel tank body exterior;

wherein the weld portion is positioned to an inner side of the bag shape from the nipping position.

8. The fuel supply device of claim 7, wherein the weld portion and the nipping position are adjacent to each other as viewed along the superimposing direction of the plurality of sheets of filter members.

* * * * *